(12) United States Patent
Bergmen

(10) Patent No.: US 7,524,416 B1
(45) Date of Patent: Apr. 28, 2009

(54) SPIN-ON OIL FILTER ADAPTOR FOR ENGINES EQUIPPED WITH INTERNAL PAPER CARTRIDGE OIL FILTERS

(75) Inventor: Daniel Robert Bergmen, Ukiah, CA (US)

(73) Assignee: Bergmen Engineering, Inc., Ukiah, CA (US)

( * ) Notice: Subject to any disclaimer, the term of this patent is extended or adjusted under 35 U.S.C. 154(b) by 342 days.

(21) Appl. No.: 11/509,888

(22) Filed: Aug. 24, 2006

Related U.S. Application Data

(60) Provisional application No. 60/711,969, filed on Aug. 25, 2005.

(51) Int. Cl.
*B01D 35/30* (2006.01)
*B01D 35/00* (2006.01)
*B01D 27/00* (2006.01)
*B01D 35/28* (2006.01)
*F01M 11/03* (2006.01)

(52) U.S. Cl. .................... 210/232; 210/443; 123/196 A

(58) Field of Classification Search ............. 123/196 A; 210/236, 437, 443, 232, 136, 130, 450, 342
See application file for complete search history.

(56) References Cited

U.S. PATENT DOCUMENTS

| | | | | |
|---|---|---|---|---|
| 3,540,594 A | * | 11/1970 | Sanderson | 210/232 |
| 4,014,794 A | * | 3/1977 | Lewis | 210/199 |
| 4,051,036 A | * | 9/1977 | Conrad et al. | 210/232 |
| 4,133,763 A | * | 1/1979 | Cooper | 210/232 |
| 4,265,748 A | * | 5/1981 | Villani et al. | 210/132 |
| 5,013,434 A | * | 5/1991 | Furrow | 210/232 |
| 5,681,461 A | * | 10/1997 | Gullett et al. | 210/232 |
| 5,685,985 A | * | 11/1997 | Brown et al. | 210/450 |
| 5,695,636 A | * | 12/1997 | Gullett | 210/232 |
| 5,702,602 A | * | 12/1997 | Brown et al. | 210/342 |
| 6,787,033 B2 | * | 9/2004 | Beard et al. | 210/323.2 |
| 6,846,411 B2 | * | 1/2005 | Elsegood | 210/222 |
| 7,000,655 B2 | * | 2/2006 | Garvin et al. | 141/100 |
| 7,384,547 B2 | * | 6/2008 | Evanovich et al. | 210/232 |
| 2001/0037971 A1 | * | 11/2001 | Bergeron | 210/443 |
| 2005/0150569 A1 | * | 7/2005 | Garvin et al. | 141/100 |
| 2007/0080106 A1 | * | 4/2007 | Gilles et al. | 210/450 |

* cited by examiner

*Primary Examiner*—Stephen K Cronin
*Assistant Examiner*—Sizo B Vilakazi
(74) *Attorney, Agent, or Firm*—Mark Meltzer

(57) ABSTRACT

An adaptor for converting the oil filtering of engines, so equipped, from internal paper-based cartridge type oil filters to automotive type spin-on oil filters is disclosed herein. The adaptor includes a mount which has screw threads at one end to allow mounting to the oil filter cavity housing in the engine. The mount has screw threads at the other end to allow the mounting of a housing as well as the spin-on oil filter. An axial hollow port in the mount allows the flow of filtered, pressurized oil from the spin-on oil filter into the main engine oil galley. The housing attached to the mount provides a sealing surface for the spin-on oil filter to mate against, thus completing the installation. The housing includes ports for the delivery of pressurized, unfiltered oil from the engine oil filter cavity to the intake ports of the spin-on oil filter.

4 Claims, 3 Drawing Sheets

SPIN-ON OIL FILTER ADAPTOR FOR ENGINES EQUIPPED WITH INTERNAL PAPER CARTRIDGE OIL FILTERS

CROSS REFERENCE TO RELATED APPLICATIONS

U.S. Provisional Patent Application Ser. No. 60/711,969

Title: SPIN-ON OIL FILTER ADAPTOR FOR ENGINES WITH INTERNAL PAPER CARTRIDGE OIL FILTERS. Date of deposit: Aug. 25, 2005.

FEDERALLY SPONSORED RESEARCH

Not Applicable.

SEQUENCE LISTING OR PROGRAM

Not Applicable.

BACKGROUND OF THE INVENTION

There are internal combustion engines that employ the use of a lubricating oil filtering apparatus that is comprised of an assemblage of parts that include the oil filtering medium (paper or some combination of paper and synthetic filtering media) as a separate oil filter element, housed internally within the engine structure and held in place or sealed by an access plate or cover. In addition to these parts, several associated parts are included to complete the oil filtering system such as an oil pressure bypass valve, gaskets to seal the oil filter assembly to the engine and positional devices within the assembly to properly position the oil filter for efficient and safe operation. When an oil filter element is to be removed and replaced during normal routine lubrication system maintenance, the access plate or cover is removed and the combination of parts described above are removed and disassembled for cleaning and oil filter element replacement. The used oil filter element is discarded and replaced with a clean, new, unused oil filter element. All of the non-replaceable parts of the oil filtering apparatus must be cleaned and inspected as part of the routine oil filter change operation, properly reassembled with the clean, new, unused oil filter element and then this assembly is installed into the oil filter cavity in the engine. This operation is time consuming, messy and provides the opportunity to improperly assemble the parts potentially damaging the engine upon starting following an oil filter change. Improperly assembled parts can also leak oil upon starting and operating the engine causing the potential for engine damage and environmental pollution as well as a safety hazard created by leaking oil on the pavement. Additionally, choices in oil filtering elements, and types of oil filtering media are generally limited to only a few examples from oil filter manufacturing companies and there are few (if any) opportunities to employ modern, highly efficient oil filter media that are offered in other types of oil filters.

It is an object of the present invention to provide a simplified, new and advantageous spin-on oil filter adaptor that allows for much cleaner, easier, simpler and less costly oil filter changes to be made during normal routine lubrication system maintenance. The used spin-on oil filter is unscrewed and dismounted from the adapter and a new, unused spin-on oil filter is threaded into place and tightened.

It is a further object of the present invention to provide a new spin-on oil filter adaptor that allows the much wider choice of oil filter products that are available from most automotive and motorcycle parts supply stores.

It is a further object of the present invention to provide a new spin-on oil filter adaptor that eliminates the time consuming and complicated disassembly, cleaning and proper reassembly of the stock (or standard) internal paper cartridge based oil filtering apparatus.

It is a further object of the present invention to provide a new spin-on oil filter adaptor that provides for the opportunity to utilize modern, sophisticated, efficient and high performance spin-on oil filter designs and products potentially extending oil and oil filter change intervals as well as providing far superior oil filtering performance over existing filtering media found in the stock (or standard) internal paper cartridge based oil filter elements.

SUMMARY OF THE INVENTION

The purpose of the spin-on oil filter adaptor of the present invention is to convert the oil filtering method of engines, so equipped, from internal paper-based cartridge type oil filters to automotive type "spin-on" oil filters. The spin-on oil filter adaptor of the present invention does not require modification of the engine, or any parts of the engine in any way in order to install and use the spin-on oil filter adaptor.

It is a further purpose of the spin-on oil filter adaptor of the present invention to replace the complicated assemblage of parts necessary to employ the stock (or standard) paper-based cartridge type oil filter, that must be removed, cleaned and properly reassembled with a simplified, permanently installed adaptor assembly that does not require removal from the engine in order to replace the oil filter.

The spin-on oil filter adaptor assembly may be sold in kit form to directly replace the standard factory oil filter apparatus without modification of any kind to the motorcycle or automotive engine.

One of the obvious advantages of this spin-on oil filter adaptor installation is to simplify the oil filter replacement and provide the opportunity to utilize modern, disposable automotive type spin-on oil filters. Removal, disassembly, cleaning and proper reassembly of the outdated stock (or standard) paper-based cartridge type oil filter apparatus will be a chore of the past once this adaptor kit is installed properly.

Comprehensive engineering operational tests and performance analysis have been performed on the spin-on oil filter adaptor of the present invention to assure no compromise exists in the oil flow or oil pressure of the present engine oil delivery system.

Significant engineering and design consultation with the engineering department of one of the major oil filter manufacturing corporations was conducted throughout the initial development phase. All oil filter performance and engineering specifications necessary to apply the most appropriate filter models were shared with the present inventor in order to assist in the design and engineering of the spin-on oil filter adaptor of the present invention.

There are more than 68 different filter models to choose from that are manufactured, or marketed, by Fram, AC Delco, Carquest, AMSOIL, Honda, K&N, Purolator, STP, WIX, Mobil One, Champion, Bosch, Napa, Baldwin, Firestone, Hastings, Auto Pro, Castrol, Deutsch, Federated and Motorcraft just to name a few. The oil filter type that this spin-on oil filter adaptor of the present invention was designed to accommodate is one of the most common and popular types utilized with many small automobiles and light trucks as well as many motorcycle models.

The spin-on oil filter adaptor of the present invention includes the following parts:

a) housing-filter adaptor b) mount-filter adaptor

The mount-filter adaptor is mounted to the engine in the same place, and with the same threads as the original oil filter bolt from the stock (or standard) oil filter apparatus once the stock (or standard) oil filter apparatus is removed from the engine. The mount-filter adaptor is installed into the engine and tightened to the engine with a specified torque figure and properly calibrated torque wrench.

The housing-filter adaptor is threaded onto the exposed end of the mount-filter adaptor and is tightened into place with the elastomer o-ring seal. The flange of the housing-filter adaptor is equipped with a groove to accept the o-ring seal and is sealed against the same surface on the engine cavity that the original oil filter cover or plate from the stock (or standard) oil filter apparatus is mounted.

The inventive spin-on oil filter adaptor takes the place of the stock (or standard) oil filter apparatus and associated parts as necessary to mount and employ the internal paper-based oil filter cartridge in the stock (or standard) configuration. It provides a permanently attached and completely sealed housing-filter adaptor, facilitating the delivery of unfiltered, pressurized oil from the engine oil pump through six peripheral oil access holes in the top of the housing-filter adaptor. The unfiltered, pressurized oil then enters the spin-on oil filter through the peripheral intake ports of the spin-on oil filter, which is threaded onto the mount-filter adaptor and tightened and sealed against the sealing surface of the inside of the housing-filter adaptor. The unfiltered, pressurized oil then passes through the filtering element of the spin-on oil filter, then passes through the central exit port of the spin-on oil filter, through the hollow mount-filter adaptor and into the main oil galley of the engine.

The spin-on oil filter adaptor of the present invention performs within (and in some cases exceeds) all standard factory oil system delivery and performance specifications of the engine to which it is properly mounted and installed.

The spin-on oil filter adaptor of the present invention, when properly mounted and installed on the engine is a passive adaptation that allows the active use of modern spin-on oil filters of a particular and popular variety.

Once the spin-on oil filter adaptor of the present invention is properly mounted and installed on the engine, changing the oil filter during routine lubrication system maintenance operations simply involves the unscrewing and removal of the old spin-on oil filter and replacing with a new spin-on oil filter.

BRIEF DESCRIPTION OF THE DRAWINGS

In order to clarify the details of the elements of the prior art design and to describe and define details of the elements of the present invention, the description being with reference to the accompanying illustrative drawings in which.

DESCRIPTION OF THE PREFERRED EMBODIMENTS

Figure 1:
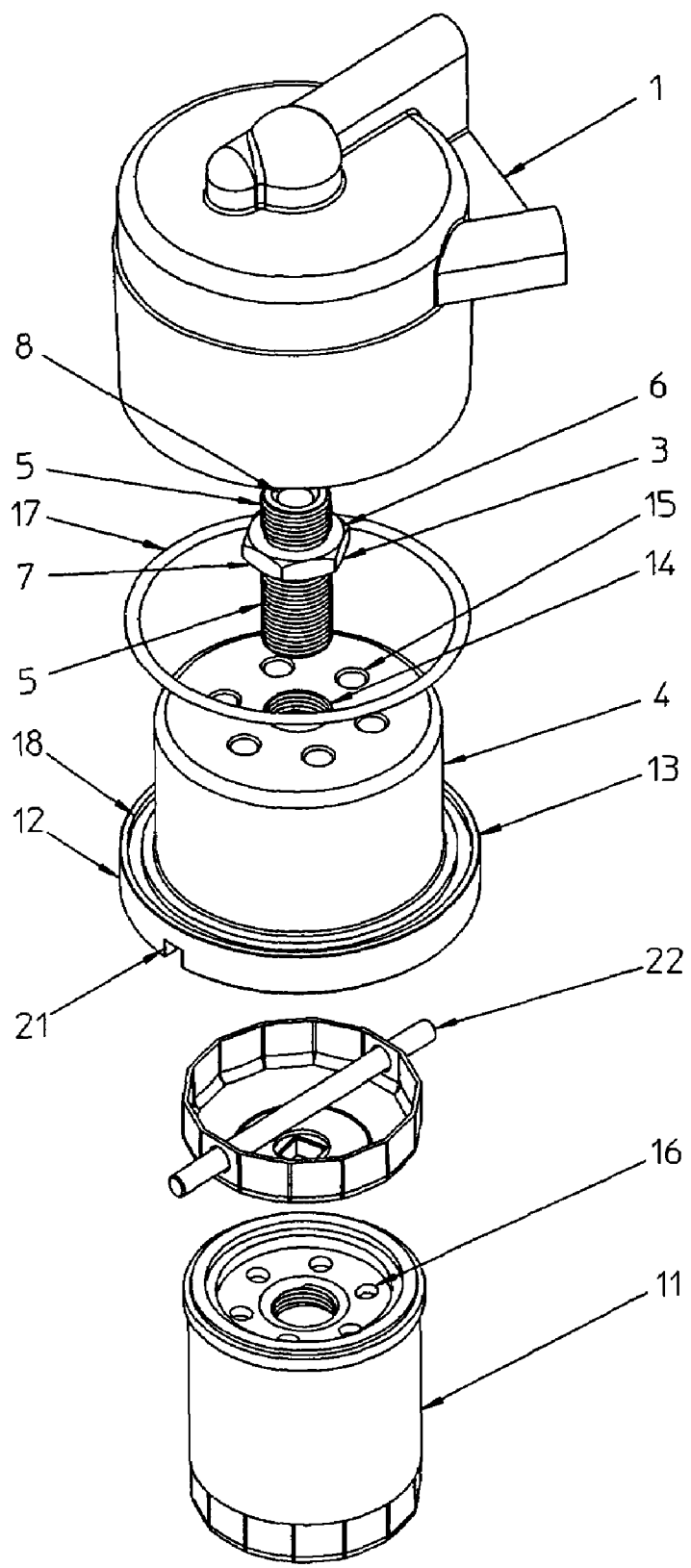
FIG. 1 is an exploded isometric perspective view, as seen from an upper viewing perspective, of the preferred embodiment of the inventive spin-on oil filter adaptor, the inventive assembly being adapted for installation into the engine cavity.
Figure 2:
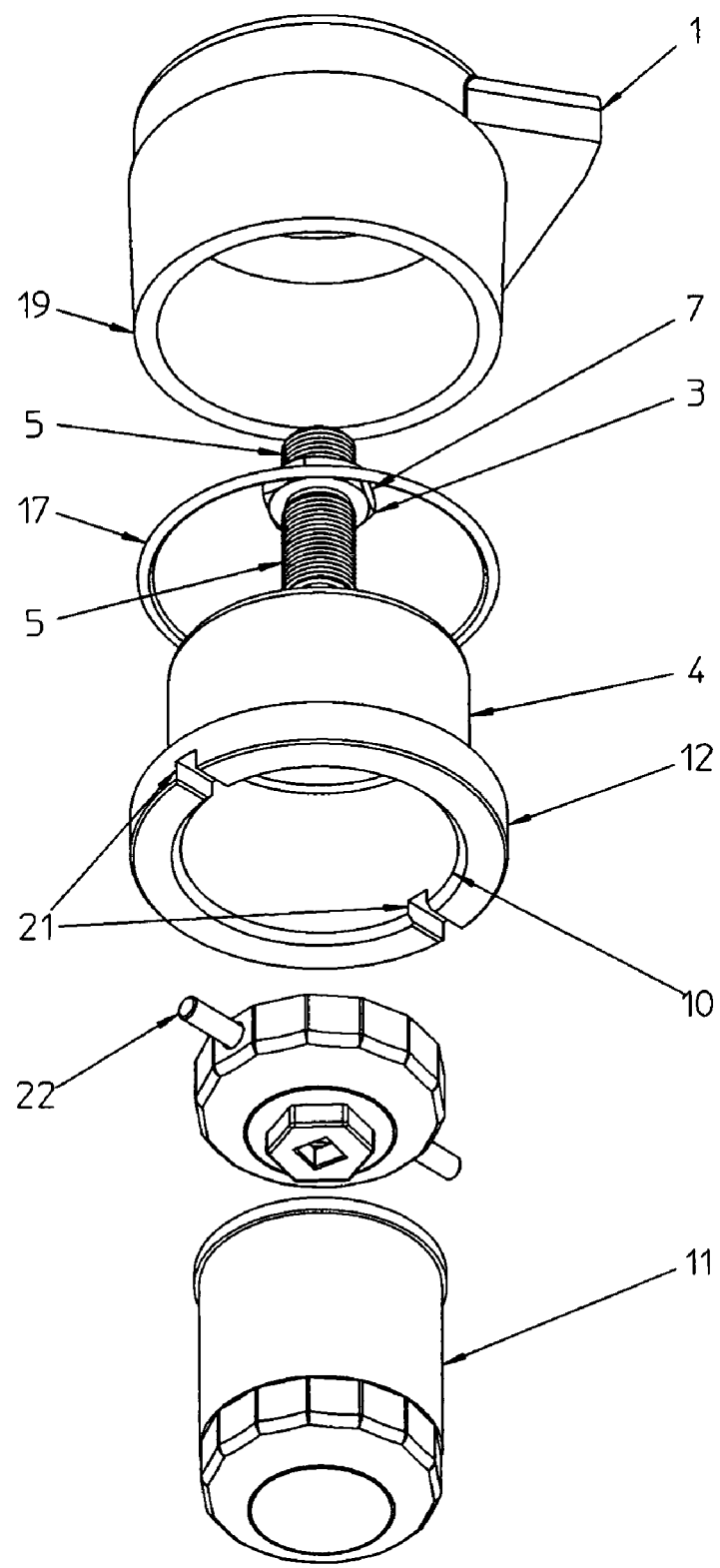
FIG. 2 is an exploded isometric perspective view, as seen from a lower viewing perspective, of the preferred embodiment of the inventive spin-on oil filter adaptor, the inventive assembly being adapted for installation into the engine cavity.
Figure 3:
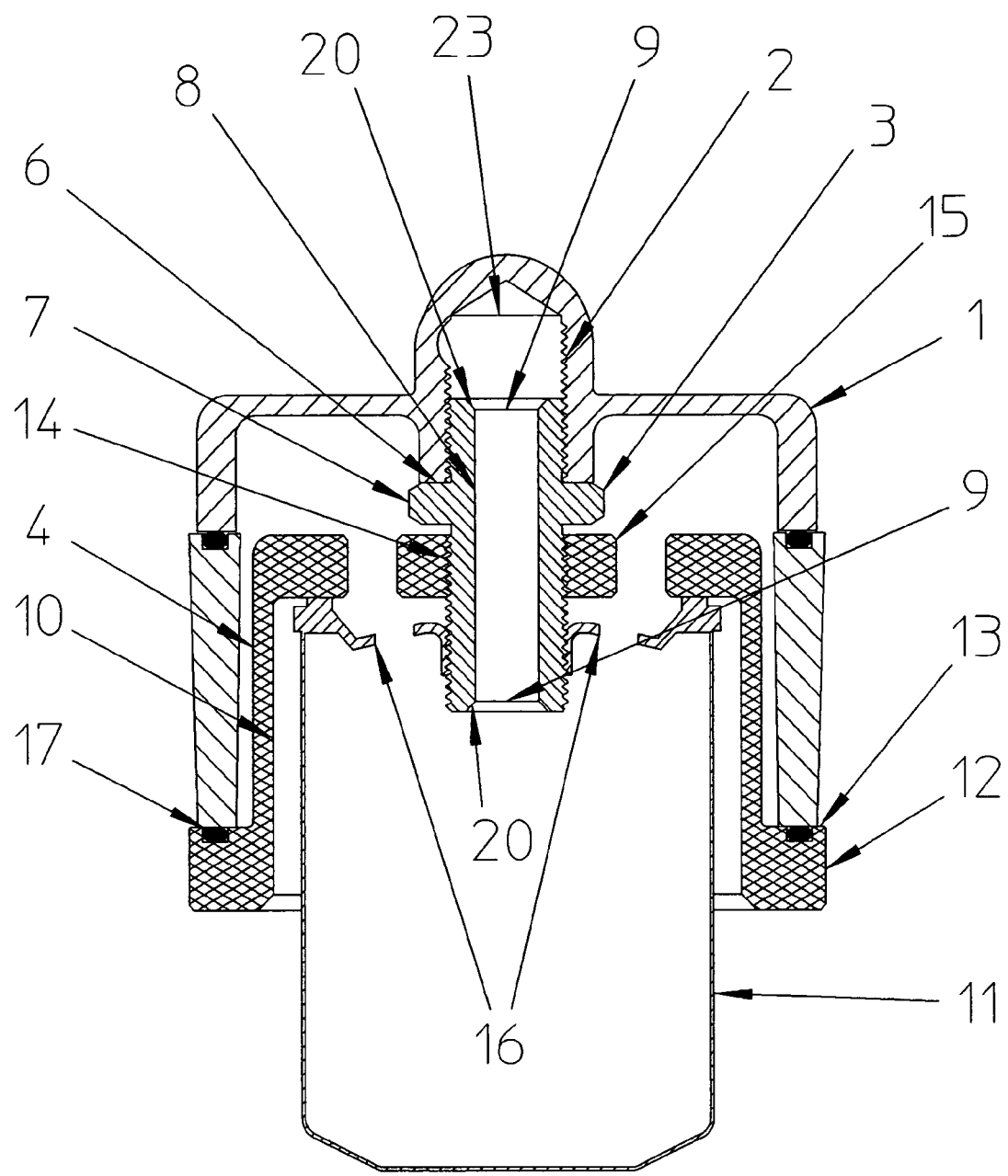
FIG. 3 is a side sectional view of the preferred embodiment of the inventive spin-on oil filter adaptor, the inventive assembly being adapted for installation into the engine cavity.

Referring to the accompanying drawings, the engine casing 1 previously occupied by an internal paper-based cartridge type oil filter element and associated apparatus is utilized as an integral cavity within the engine for the purposes of installing the preferred embodiment of the spin-on oil filter adaptor of the present invention.

Wherein the engine casing 1 having an internal threaded opening 2 being utilized as a mounting feature for installing the mount-filter adaptor 3 and tightening said mount up to the flanged surface of the threaded opening 2. The mount-filter adaptor employs screw threads 5 along its external cylindrical surface in two locations for the purposes of installation into the internal threaded opening 2 of the engine casing and for providing a means for installing the housing-filter adaptor 4.

Said mount-filter adaptor 3 having a flange 6 located between its ends positioned for the purpose of seating said flange 6 against the flanged surface of the engine casing 1.

The mount-filter adaptor 3 performs the necessary roles of providing two strong and secure threaded portions for installation into the engine casing 2 and securing the housing-filter adaptor 4 as well as providing a hollow interior 8 for the passage of engine oil through openings at either end 9 from the spin-on oil filter 11 as it enters the main oil galley of the engine 23. At either end of the hollow portion of the mount-filter adaptor are beveled edges 20 to enhance the transitional oil flow from the spin-on oil filter to the main oil galley 23.

In addition, the mount-filter adaptor 3 has, positioned on the peripheral edges of the flange 6, at least one, and as many as six flat surfaces 7 for the purpose of engaging a standard socket wrench in order to install and tighten the mount-filter adaptor 3 into the engine casing 1.

The housing-filter adaptor 4 utilizes a properly sized internal cylindrical opening 10 in order to accept a spin-on oil filter 11 of a popular and conveniently available category or type.

The housing-filter adaptor 4 is secured to the mount-filter adaptor 3 by means of a threaded hole 14 with screw threads that are of the same size and type as those screw threads 5 on the external cylindrical surfaces of the mount-filter adaptor 3. On this same surface as the threaded hole 14 are at least one and as many as six oil access holes 15 for the purpose of providing a flow path of the pressurized, unfiltered oil from the oil pump in the engine to the intake ports 16 of the spin-on oil filter.

On the opposite end of the housing-filter adaptor 4 is a flange 12 that provides a sealing surface 13 for sealing against the flange 19 of the engine casing 1. Within the surface of this flange 12, is a groove 18 for the purpose of accommodating an O-ring 17 to enhance the seal between the flange 12 and the engine casing 1. As the housing-filter adaptor 4 is installed and tightened into the engine casing 1, the flange 12 and O-ring 17 form an oil-tight seal to prevent leakage of pressurized oil during the normal operation of the engines lubrication system.

Also on this flange 12 are at least two slots 21 to engage the installation tool 22 for the purposes of properly installing and tightening and loosening and removing the housing-filter adaptor 4.

What is claimed is:

1. A device for installing a spin on oil filter on an engine in a general location relative to the engine casing previously occupied by an internal cartridge oil filter wherein the engine casing has a threaded opening for the passage of oil comprising:

a mount filter adaptor;

a housing filter adaptor;

said mount filter adapter having external threads along its longitudinal axis;

said mount filter adaptor having a flange located between its ends and extending radially outward perpendicular to the longitudinal axis of said adaptor to define a surface with greater diameter than the threaded portion of said mount filter adaptor for limiting travel when said adaptor's threads are engaged in a mating relationship with an engine casing having a threaded oil passage opening;

said mount filter adaptor flange having at least one flat edge on its outer surface with flange dimensions permitting secure mating with a standard socket wrench for ease of installation;

said mount filter adaptor having a hollow interior and openings at either end for allowing the passage of oil there through;

said housing filter adaptor having a substantially cylindrical opening with dimensions at one end permitting the insertion of a standard spin on oil filter within said opening;

said housing filter adaptor having a flange at the open end of its cylindrical opening and extending around the periphery of said opening to form a sealing surface with which to engage the engine easing surface;

said housing filter adaptor having a threaded hole centered in the bottom of the other end of said cylindrical opening for threaded engagement with the threads on the exterior of said mount filter adaptor;

said housing filter adaptor having at least one hole in said other end of said cylindrical opening and spaced radially outward from said threaded hole to permit the passage of unfiltered oil into the intake ports of a spin on oil filter;

said housing filter adaptor, said mount filter adaptor and a spin on oil filter forming when screwed together an oil tight assembly which permits unfiltered oil to enter the filter and filtered oil to re-enter the engine, said housing filter adapter flange having at least two slots located directly opposite from each other on the flange circumference for receiving an installation tool which can be used to impart a torque force to said adaptor for installing or removing it.

2. The device of claim 1 further comprising:

said mount filter adaptor is made from high strength alloy steel;

said housing filter adaptor is made from aluminum alloy;

and said housing filter adaptor is sealed against the engine casing by an O ring seated within a relieved circular groove on said flange for creating a pressure tight seal between the housing filter adaptor and the engine casing when the housing filter adaptor is tightened against the engine casing.

3. The device of claim 2 further comprising:

said mount filter adaptor has cylindrical chamfered inner surfaces at either end for enhancing transitional oil flow into and out of its said open passage.

4. The device of claim 1 further comprising:

said housing filter adaptor and said mount filter adaptor having dimensions which permit installation of a spin on oil filter in the same general location previously occupied by an internal cartridge oil filter.

\* \* \* \* \*